(12) United States Patent
Chelnokov

(10) Patent No.: US 11,847,722 B2
(45) Date of Patent: Dec. 19, 2023

(54) OUT OF VIEW CT SCAN RECONSTRUCTION

(71) Applicant: James R. Glidewell Dental Ceramics, Inc., Newport Beach, CA (US)

(72) Inventor: Fedor Chelnokov, Khimki (RU)

(73) Assignee: James R. Glidewell Dental Ceramics, Inc., Newport Beach, CA (US)

( * ) Notice: Subject to any disclaimer, the term of this patent is extended or adjusted under 35 U.S.C. 154(b) by 96 days.

(21) Appl. No.: 17/107,071

(22) Filed: Nov. 30, 2020

(65) Prior Publication Data

US 2022/0172411 A1  Jun. 2, 2022

(51) Int. Cl.
G06T 11/00 (2006.01)
G06T 7/68 (2017.01)
G06T 7/00 (2017.01)

(52) U.S. Cl.
CPC .......... G06T 11/006 (2013.01); G06T 7/0012 (2013.01); G06T 7/68 (2017.01); G06T 11/008 (2013.01); G06T 2207/10081 (2013.01); G06T 2207/30036 (2013.01); G06T 2211/421 (2013.01)

(58) Field of Classification Search
None
See application file for complete search history.

(56) References Cited

U.S. PATENT DOCUMENTS

| | | |
|---|---|---|
| 5,224,037 A | 6/1993 | Jones et al. |
| 6,343,108 B1 | 1/2002 | Heuscher |
| 7,085,342 B2 | 8/2006 | Younis et al. |
| 7,251,307 B2 | 7/2007 | Chen |
| 7,277,595 B1 | 10/2007 | Reid |
| 7,330,528 B2 | 2/2008 | Jefferson |
| 7,940,884 B2 | 5/2011 | Bruder et al. |
| 8,442,293 B2 | 5/2013 | Bruder et al. |
| 8,723,866 B2 | 5/2014 | Buyanovskiy |
| 8,842,904 B2 | 9/2014 | Chen |
| 9,155,514 B2 | 10/2015 | Panin et al. |
| 9,495,769 B2 | 11/2016 | Bruder et al. |
| 9,498,177 B2 | 11/2016 | Bruder et al. |
| 10,229,517 B2 | 3/2019 | Raupach et al. |
| 2004/0170248 A1* | 9/2004 | Cahill ................... G06T 11/005 378/19 |
| 2004/0183812 A1 | 9/2004 | Raskar et al. |
| 2010/0246918 A1 | 9/2010 | Kappler et al. |

(Continued)

FOREIGN PATENT DOCUMENTS

| | | |
|---|---|---|
| EP | 0825457 A2 | 2/1998 |
| WO | 2017191162 A1 | 11/2017 |

OTHER PUBLICATIONS

Principles of Computerized Tomographic Imaging (A. C. Kak and Malcolm Slaney, Principles of Computerized Tomographic Imaging, IEEE Press, 1988), See whole book.

(Continued)

*Primary Examiner* — Nancy Bitar
(74) *Attorney, Agent, or Firm* — Charles C. Fowler

(57) ABSTRACT

A computer-implemented method and system of CT reconstruction can include receiving one or more CT projection images; performing smooth filtering on the one or more CT projection images to generate one or more smooth boundary filtered images; and back-projecting the one or more smooth boundary filtered images.

10 Claims, 21 Drawing Sheets

(56) References Cited

U.S. PATENT DOCUMENTS

| | | | |
|---|---|---|---|
| 2011/0002395 A1 | 1/2011 | Nishihara | |
| 2011/0142316 A1 | 6/2011 | Wang et al. | |
| 2011/0164031 A1 | 7/2011 | Shi | |
| 2012/0170822 A1* | 7/2012 | Litvin | G06T 11/006 382/131 |
| 2016/0095668 A1 | 4/2016 | Kuo et al. | |
| 2016/0163073 A1* | 6/2016 | Grass | G06V 10/22 382/131 |
| 2018/0132982 A1 | 5/2018 | Nikolskiy et al. | |
| 2020/0178910 A1 | 6/2020 | Suzuki et al. | |
| 2020/0205943 A1 | 7/2020 | Elbaz et al. | |

OTHER PUBLICATIONS

Varlik Kilic et al., GPU Supported Haptic Device Integrated Dental Simulation Environment, in 6 pages.

Thomas Hollt, GPU-Based Direct Volume Rendering of Industrial CT Data, Jul. 2007, in 84 pages.

Issa Ibraheem, Reduction of artifacts in dental cone beam CT images to improve the three dimensional image reconstruction, Research Gate, J. Biomedical Science and Engineering, 2012, 5, 409-415, Published Online Aug. 2012.

Pan Zheng, et al., Finite Difference Error Analysis of Geometry Properties of Implicit Surfaces, 2011 IEEE Symposium on Computers & Informatics, Downloaded on Nov. 23, 2021, in 6 pages.

Application No. PCT/US2021/059748, International Search Report and Written Opinion, dated Feb. 8, 2022, in 14 pages.

Maria E. Lyra et al., Filtering in SPECT image reconstruction, Research Gate, Article in International Journal of Biomedical Imaging, Jan. 2011, in 15 pages.

Discrete Cosine, https://www.cmlab.csie.ntu.edu.tw/cml/dsp/training/coding/transform/dct.html, printed Nov. 29, 2020.

Euclid Seeram, et al., Does Iterative Reconstruction Improve Image Quality and Reduce Dose in Computed Tomography?, www.researchgate.net/publication/308388024, Open Journal of Radiology—Sep. 2016, ISSN 2473-0947, Department of Medical Imaging and Radiation Sciences, Monash University, Clayton, Victoria, Australia, in 14 pages.

\* cited by examiner

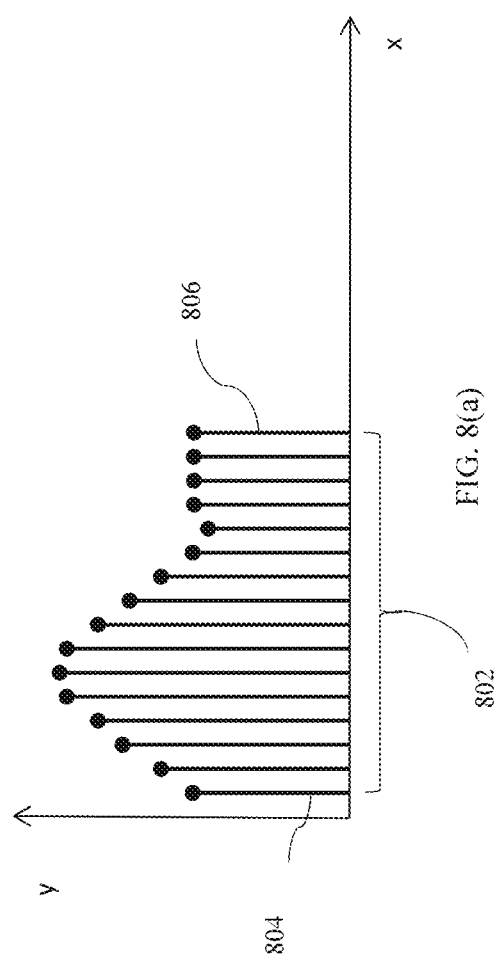

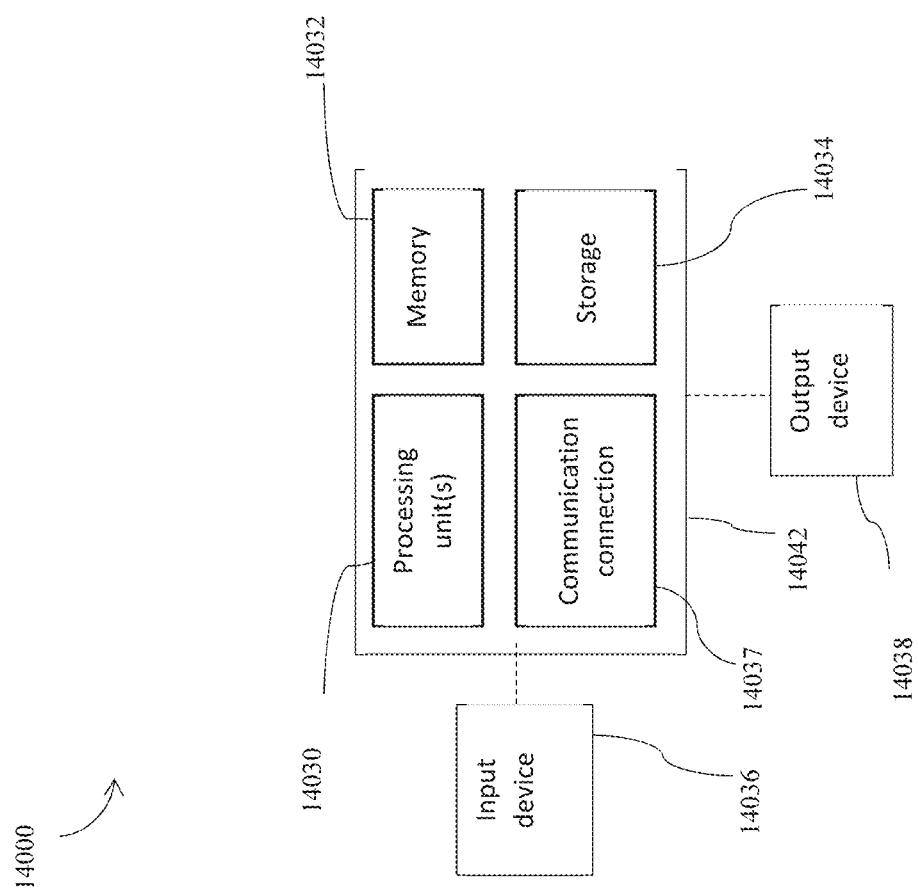

OUT OF VIEW CT SCAN RECONSTRUCTION

BACKGROUND

A computed tomography scan ("CT scan") typically involves placing a physical object on a rotating platform inside a Computed Tomography scanner (CT scanner) between an x-ray source and x-ray detector and rotating the object around an axis of rotation to generate radiographs from the x-rays detected by the detector. Conventionally, the CT scanner can tomographically reconstruct the radiographs into a 3D representation of the object scanned ("CT reconstruction"). One example of CT reconstruction can be found in, for example, in the publication *Principles of Computerized Tomographic Imaging* (A. C. Kak and Malcolm Slaney, Principles of Computerized Tomographic Imaging, IEEE Press, 1988), the entirety of which is incorporated by reference herein. Other types of CT reconstruction can also be performed.

For proper tomographic reconstruction, relevant portions of the physical object ideally experience x-rays that are detected at every rotational position as the object is rotated during scanning. When the one or more physical objects are placed in the scanner, they may be shifted laterally so that relevant portions of the object to do not encounter x-rays that hit the detector at every rotational position. If relevant portions of the object do not encounter x-rays that hit the detector at one or more of the object's rotational positions, then the tomographic reconstruction can be missing, inaccurate, and/or difficult to see. Conventionally, CT reconstruction is limited to within a capped cylinder, where each portion of the scanned object experiences x-rays that reach the detector at every rotational position. If an important portion of the scanned object is out of the scanner view in at least one rotational position, then that portion is not reconstructed and is missing from the volume. Additionally, if any portion of the scanned object touches or penetrates the imaginary boundary of the view cylinder, then this can cause bright regions to appear at the view cylinder boundary and even regions within the view cylinder, thereby reducing the quality of the reconstruction.

SUMMARY

A computer-implemented method of CT reconstruction can include receiving one or more CT projection images; performing smooth filtering on the one or more CT projection images to generate one or more smooth boundary filtered images; and back-projecting the one or more smooth boundary filtered images.

A system to CT reconstruct images can include: a processor; a computer-readable storage medium including instructions executable by the processor to perform steps including: receiving one or more CT projection images; performing smooth filtering on the one or more CT projection images to generate one or more smooth boundary filtered images; and back-projecting the one or more smooth boundary filtered images.

A non-transitory computer readable medium storing executable computer program instructions for CT reconstruction, the computer program instructions including instructions for: receiving one or more CT projection images; performing smooth filtering on the one or more CT projection images to generate one or more smooth boundary filtered images; and back-projecting the one or more smooth boundary filtered images.

BRIEF DESCRIPTION OF THE DRAWINGS

FIG. 8(a) and FIG. 8(b) are graphs illustrating pixel attenuation values for a row of a detector.

FIG. 13 is a diagram of a system in some embodiments.

DETAILED DESCRIPTION

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently.

Moreover, for the sake of simplicity, the attached figures may not show the various ways in which the disclosed methods can be used in conjunction with other methods. Additionally, the description sometimes uses terms like "provide" or "achieve" to describe the disclosed methods. The actual operations that correspond to these terms may vary depending on the particular implementation and are readily discernible by one of ordinary skill in the art.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

In some examples, values, procedures, or apparatus may be referred to as "lowest," "best," "minimum," or the like. It will be appreciated that such descriptions are intended to indicate that a selection among many alternatives can be made, and such selections need not be better, smaller, or otherwise preferable to other selections.

In the following description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Figure 1:
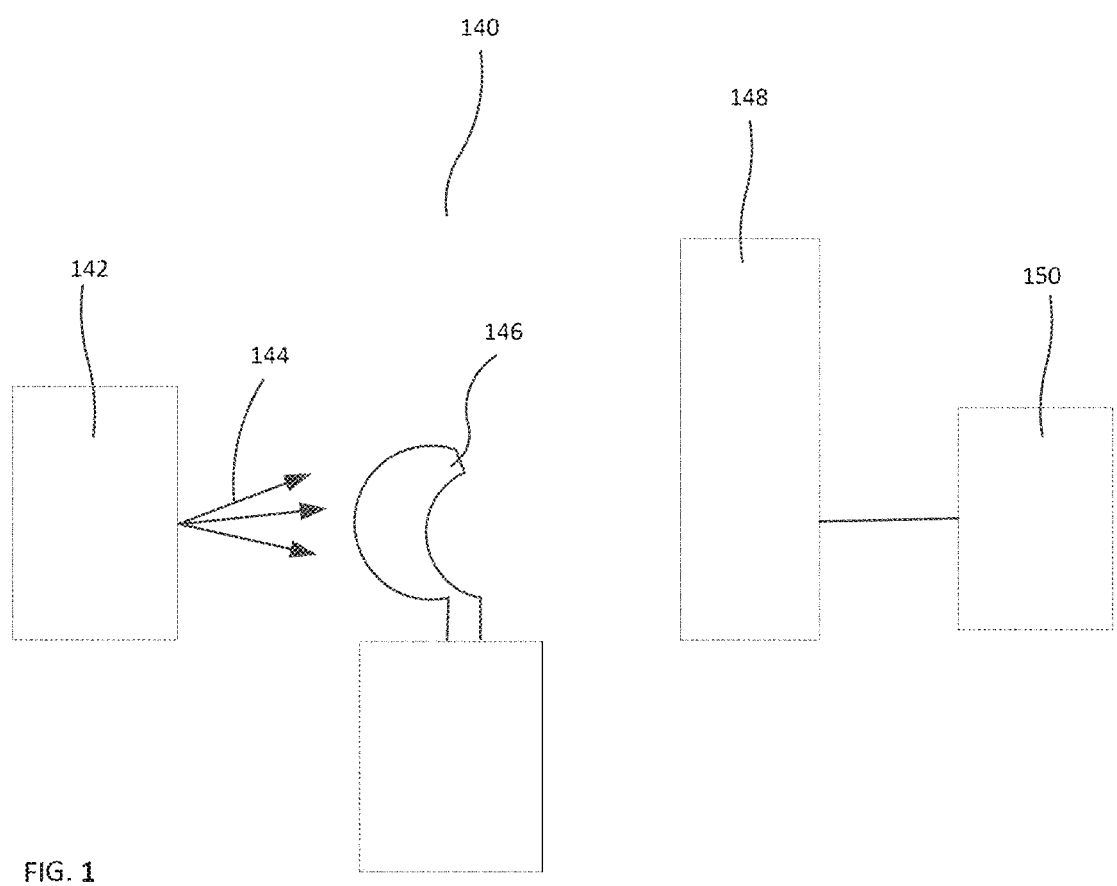
FIG. 1 shows an example of a schematic diagram of a computed tomography (CT) scanning system.

A computed tomography (CT) scanner uses x-rays to make a detailed image of an object. A plurality of such images are then combined to form a 3D model of the object. A schematic diagram of an example of a CT scanning system 140 is shown in FIG. 1. The CT scanning system 140 includes a source of x-ray radiation 142 that emits an x-ray beam 144. An object 146 being scanned is placed between the source 142 and an x-ray detector 148. In some embodiments, the object can be any object that can, for example, fit in a CT scanning system and be penetrated by x-rays. The x-ray detector 148, in turn, is connected to a processor 150 that is configured to receive the information from the detector 148 and to convert the information into a digital image file. Those skilled in the art will recognize that the processor 150 may comprise one or more computers that may be directly connected to the detector, wirelessly connected, connected via a network, or otherwise in direct or indirect communication with the detector 148.

An example of a suitable scanning system 140 includes a Nikon Model XTH 255 CT Scanner (Metrology) which is commercially available from Nikon Corporation. The example scanning system includes a 225 kV microfocus x-ray source with a 3 μm focal spot size to provide high performance image acquisition and volume processing. The processor 150 may include a storage medium that is configured with instructions to manage the data collected by the scanning system. A particular scanning system is described for illustrative purposes; any type/brand of CT scanning system can be utilized.

Figure 2:
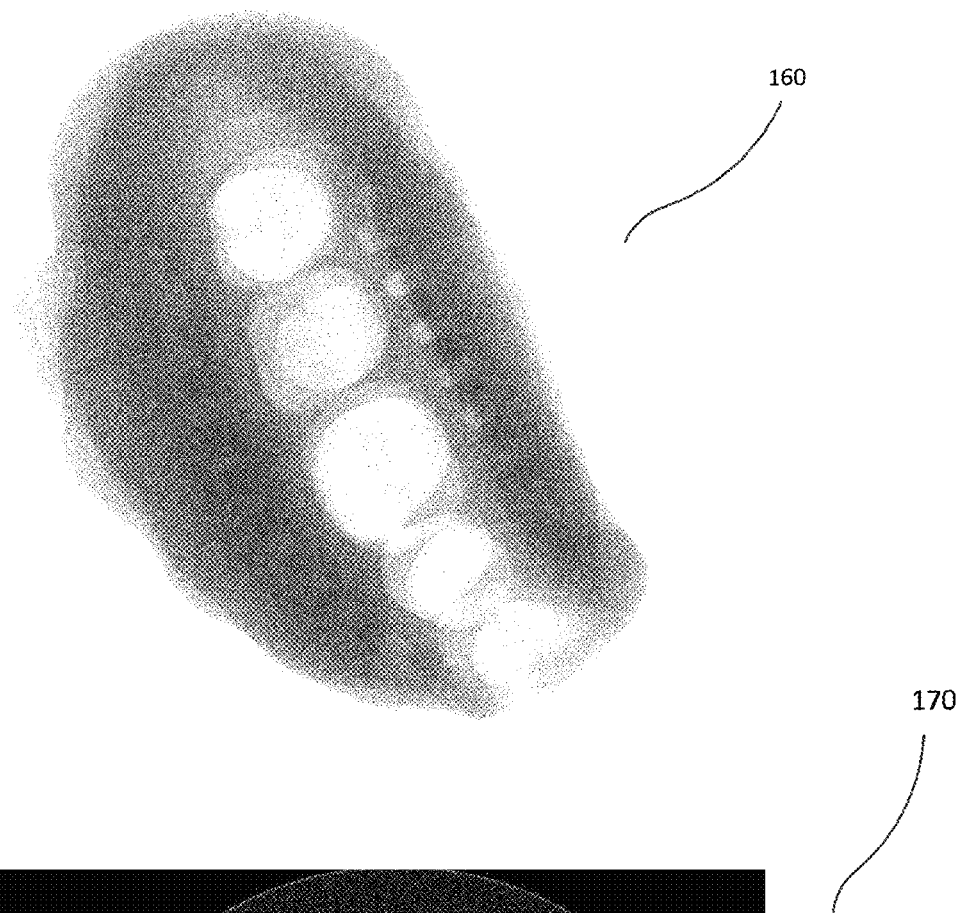
FIG. 2 shows an example of a 2-dimensional (2D) radiographic image of a dental impression tray containing a dental impression.

One example of CT scanning is described in U.S. Patent Application No. US20180132982A1 to Nikolskiy et al., which is hereby incorporated in its entirety by reference. As noted above, during operation of the scanning system 140, the object 146 is located between the x-ray source 142 and the x-ray detector 148. A series of images of the object 146 are collected by the processor 150 as the object 146 is rotated in place between the source 142 and the detector 146. An example of a single radiograph 160 is shown in FIG. 2. The radiograph 160 and all radiographs described herein are understood to be digital. In one embodiment, a series of 720 images can be collected as the object 146 is rotated in place between the source 142 and the detector 148. In other embodiments, more images or fewer images may be collected as will be understood by those skilled in the art. In some embodiments, radiographs can be referred to as projection images.

Figure 3:
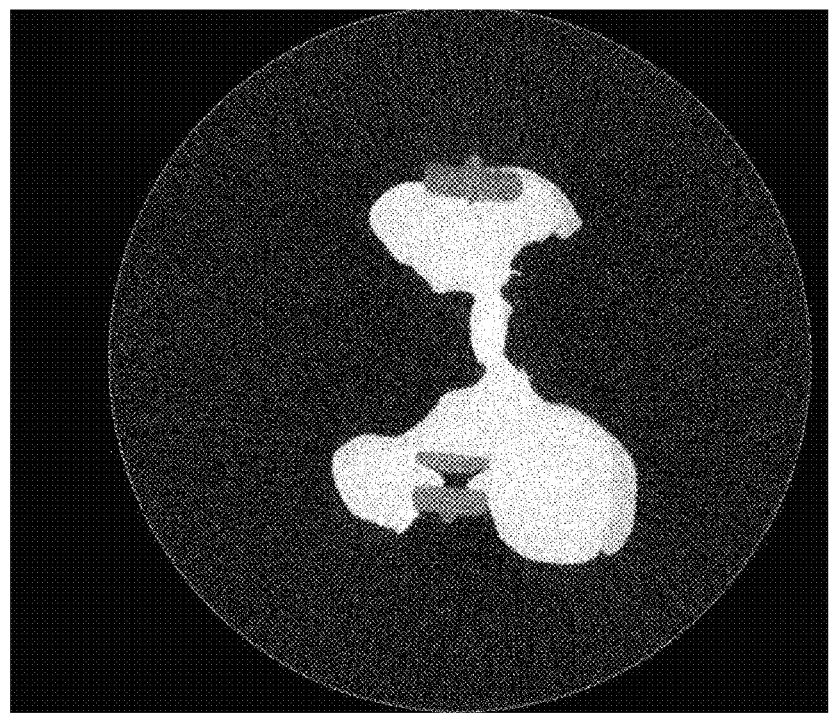
FIG. 3 shows an example of a cross-section of a 3-dimensional (3D) volumetric image.

The plurality of radiographs 160 of the object 146 are generated by and stored within a storage medium contained within the processor 150 of the scanning system 140, where they may be used by software contained within the processor to perform additional operations. For example, in an embodiment, the plurality of radiographs 160 can undergo tomographic reconstruction in order to generate a 3D virtual image 170 (see FIG. 3) from the plurality of 2D radiographs 160 generated by the scanning system 140. In the embodiment shown in FIG. 3, the 3D virtual image 170 is in the form of a volumetric image or volumetric density file (shown in cross-section in FIG. 3) that is generated from the plurality of radiographs 160 by way of a CT reconstruction algorithm associated with the scanning system 140. Any other CT scanning system known in the art can be used in some embodiments.

Figure 4:
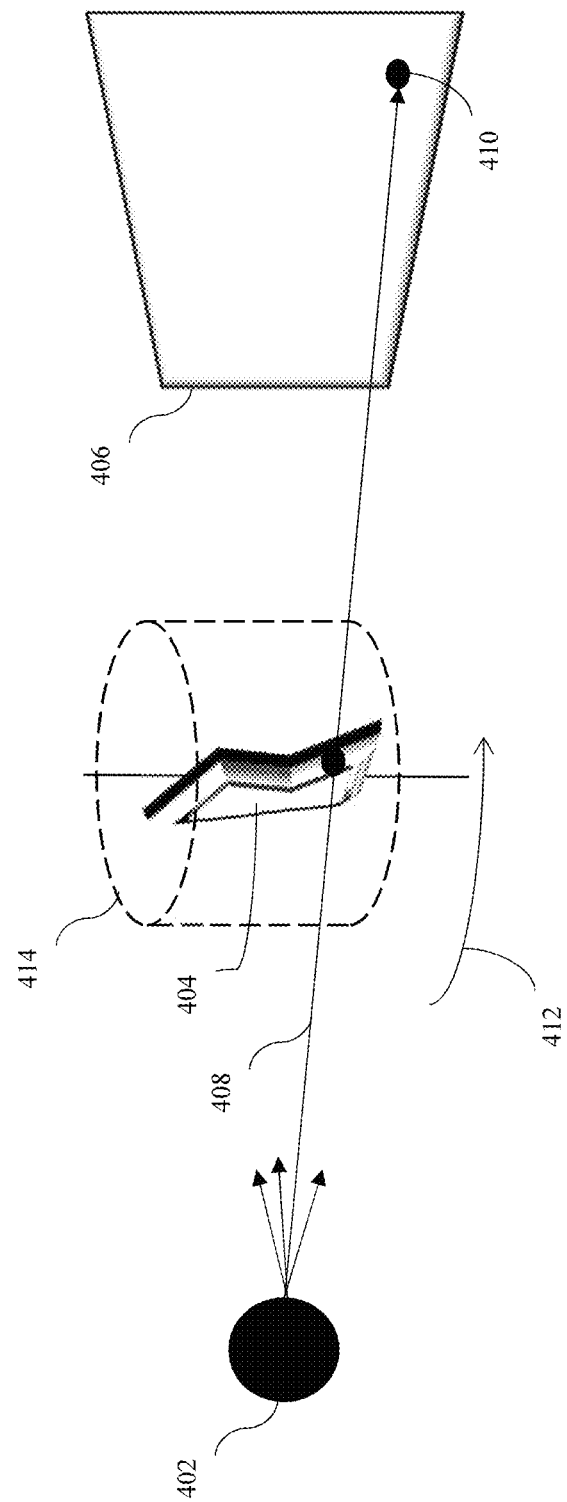
FIG. 4 is a diagram illustrating an example CT scanning system.

FIG. 4 is a side view of a diagram of an example of a CT scanning system with an x-ray source 402, a scanned object 404, a detector 406, and one or more x-rays such as x-ray 408 originating from the x-ray source 402 and being detected at detection point 410 on the detector 406. The object can be rotated in a rotation direction clockwise or counter clockwise during scanning. For example, FIG. 4 illustrates a rotation direction 412. Conventional CT reconstruction is typically achieved within a capped cylinder such as capped cylinder 414, where for each object point every line from the x-ray source 402 hits the detector 406 at every rotational position of the rotation platform.

Figure 5A:
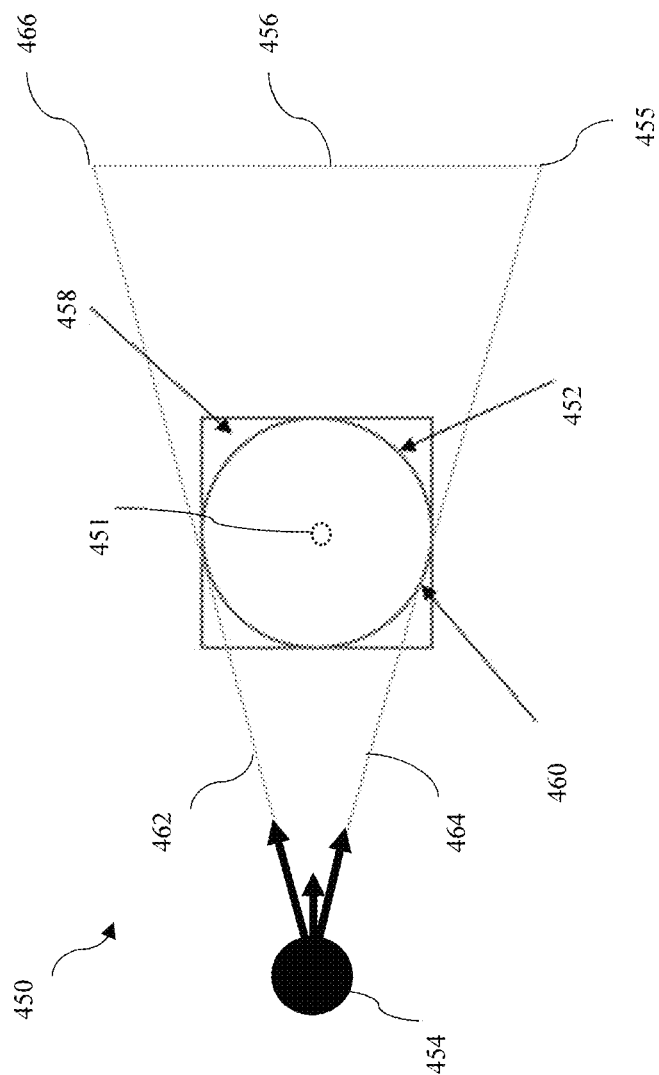
FIGS. 5(a) and 5(b) are diagrams illustrating an example of a conventional CT scanning system.
Figure 5B:
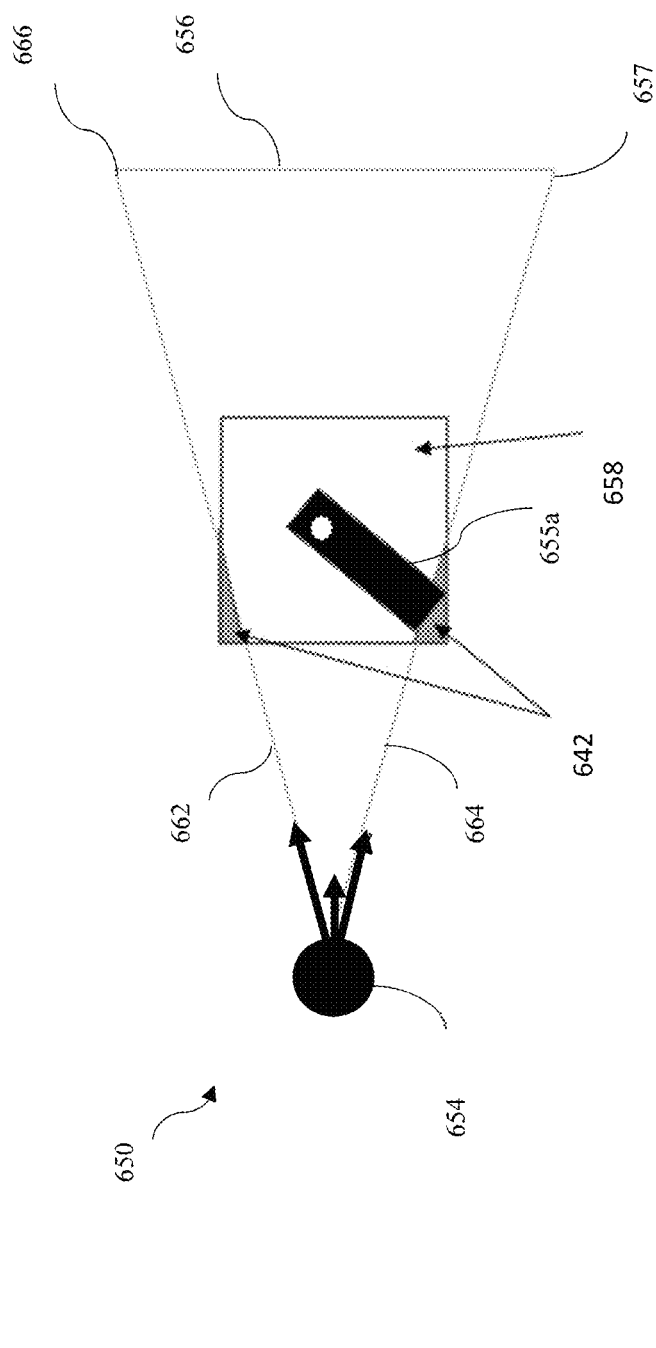

FIG. 5(*a*) illustrates a schematic diagram showing an example of a conventional CT scanning system 450 as seen from the top (in the x-y plane). One or more x-rays emitted from x-ray source 454 are detected at detector 456. For cone-beam x-rays emitted from CBCT scanners, the viewable field can be bounded (in the x-y plane) by a first boundary 462 extending between the x-ray source 454 and a first detector edge 466, by a second boundary 464 extending between the x-ray source 454 and a second detector edge 455, and by the detector 456. Any objects within this boundary will be detected by the detector 456. Any objects outside of the boundary will not be detected by the detector. In the example diagram, an object positioned to have an axis of rotation 451 will result in a reconstructed volume 458. Due to the first boundary 462 and the second boundary 464, however, the field of view is limited to be within the view cylinder 452. For example, first boundary 464 touches the view cylinder 452 at intersection point 460.

In some embodiments, one or more portions of the object(s) can be laterally out-of-view, indicating a lateral out-of-view shift, for example. As illustrated in a CT scanning system 650 of FIG. 5(*b*), regions such as lateral out-of-view regions 642 are not detected by the detector 656 since they do not fall within the x-ray field of view bounded (in the x-y plane) by a first boundary 662 extending between the x-ray source 654 and a first detector edge 666, by a second boundary 664 extending between the x-ray source 654 and a second detector edge 657, and by the detector 656. If any portion of the one or more objects being scanned extends into the lateral out-of-view regions 642 at one or more rotational positions as the object is rotated during scanning, then the object is considered laterally out-of-view. For example, as illustrated in the FIG. 5(b), at least a portion of the object at rotational position 655a extends into an out-of-view region 642. When the object scan is reconstructed to generate the reconstructed voxel image 658, the laterally out-of-view region's digital surface in the voxel file can be either missing, distorted, blurry, or inaccurate, even if reconstruction algorithms attempt to fill in the missing data at the rotational position 655a. This distortion can occur even if the at least portion is within the x-ray field of view at another rotational position. This type of lateral out-of-view shift occurs in the x-y plane (for example, horizontal or sideways shift).

Figure 6A:
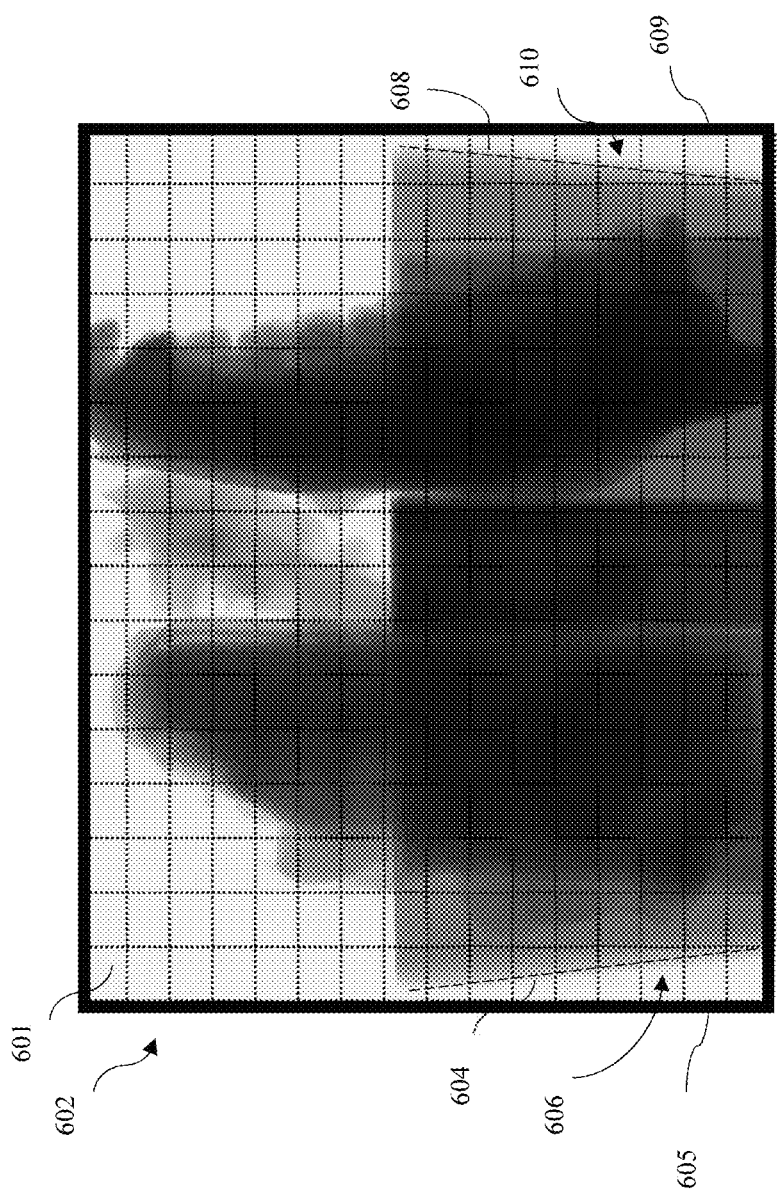
FIG. 6(a) and FIG. 6(b) are illustrations of projection images and their relationship to detector rows.

FIG. 6(a) illustrates an example of a first projection image 602 that can be generated by a CT scanning system. One or more detector pixels 601 are illustrated on the first projection image 602. The first projection image 602 is taken at 0 degrees rotation, for example. As can be seen in the figure, no portion of a scanned object is outside of the field of view at this rotational position. For example, a first projected edge 604 of the scanned object in the projection image 602 is separated from a first detector edge 605 by an air gap 606. Similarly, a second projected edge 608 of the scanned object in the projection image is separated from a detector edge 609 by an air gap 610.

Figure 6B:
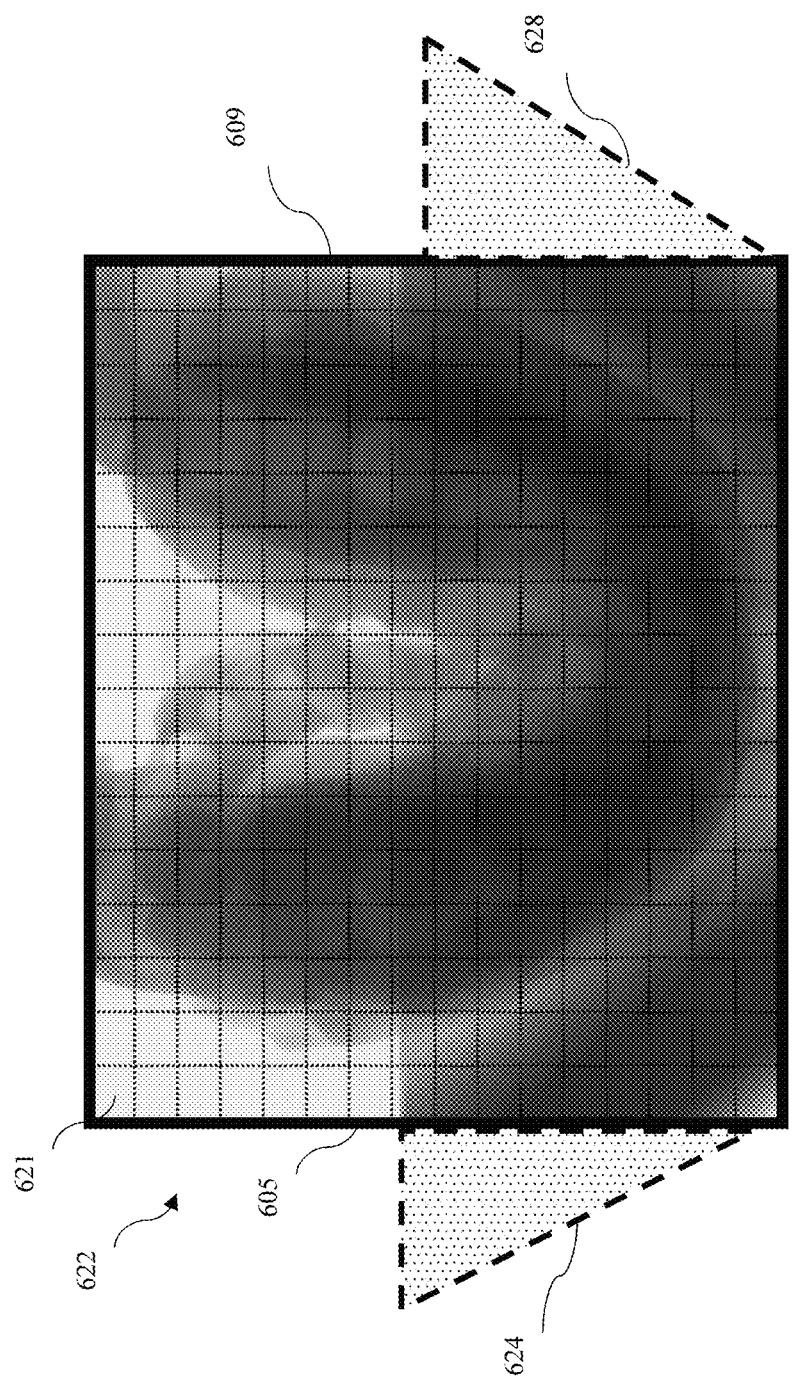

As the image is rotated and more projection images are obtained, however, at least a portion of the object can be laterally out of view. In FIG. 6(b), at least a portion of the scanned object is outside of the projection image 622. FIG. 6(a) illustrates an example of a first projection image 622 that can be generated by a CT scanning system. One or more detector pixels 621 are illustrated on the first projection image 622. The first projection image 622 is taken at 90 degrees rotation, for example. As can be seen in the figure, portions of a scanned object are outside of the field of view at this rotational position. For example, a scanned object edge 624 extends beyond the first detector edge 605 and is not detected. Similarly, a scanned object edge 628 or extends beyond the detector edge 609 and is not detected. These edges can be outside of the view cylinder in conventional scanners.

Figure 7A:
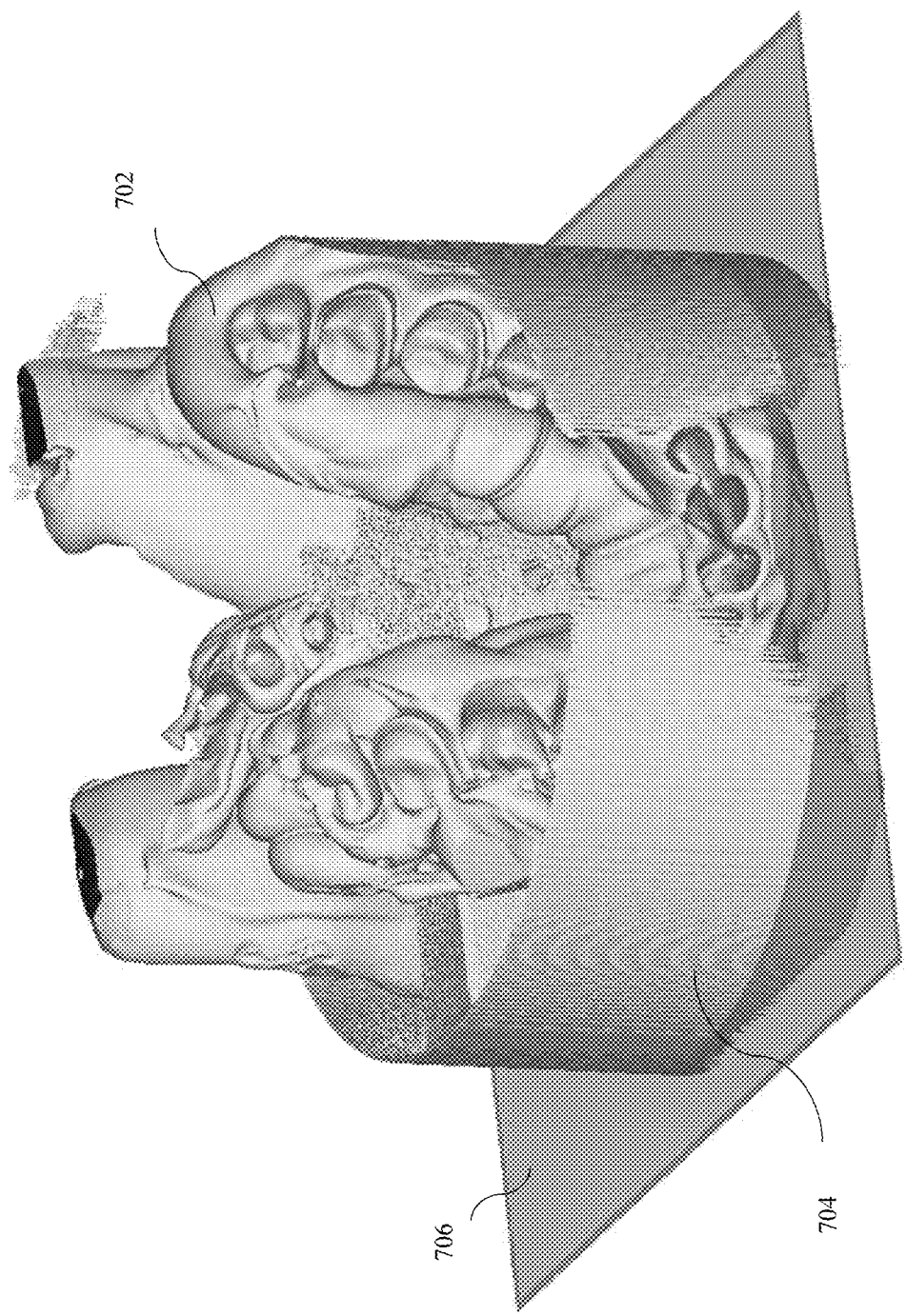
FIG. 7(a) is a perspective view of a 3D drawing illustrating conventional reconstruction.
Figure 7B:
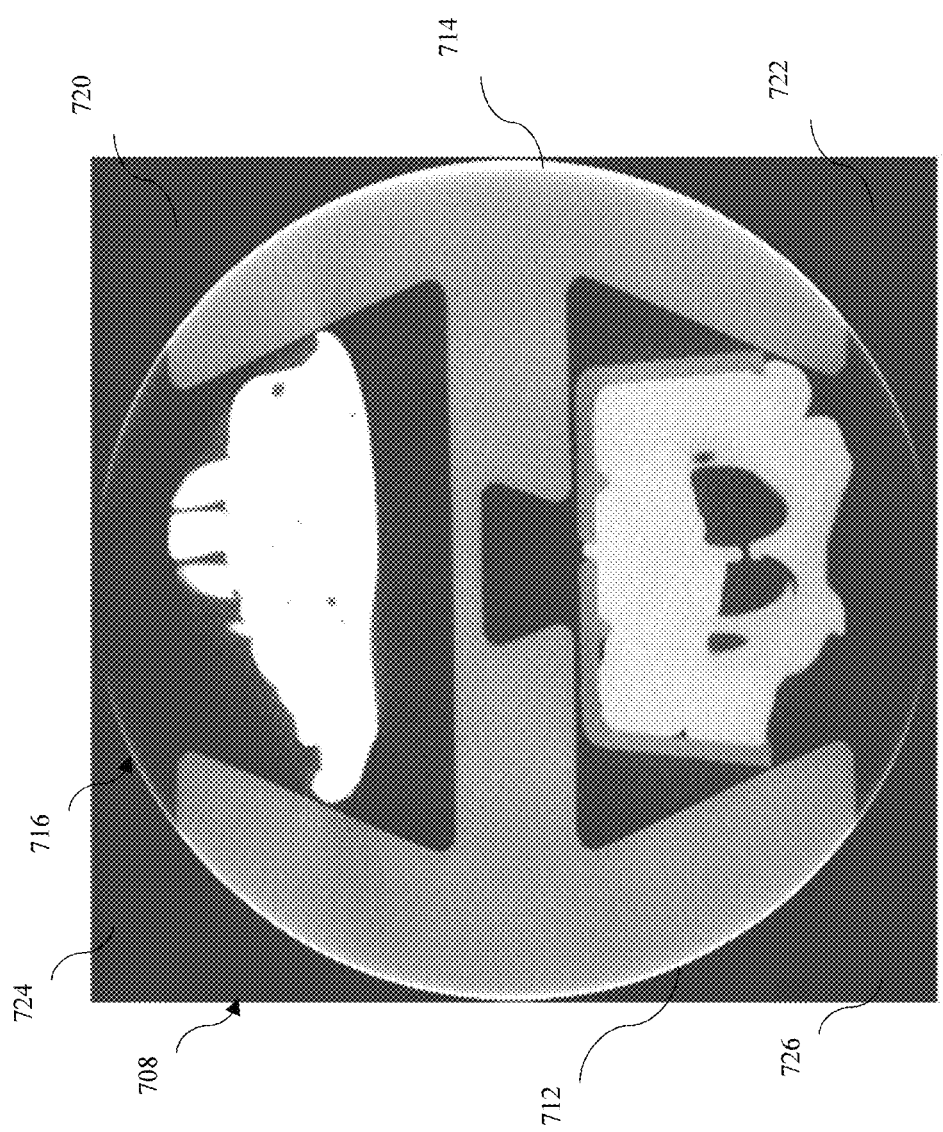
FIG. 7(b) is an illustration of a conventionally reconstructed image.

FIG. 7(a) shows an illustration of an example of conventional CT reconstruction. A scanned object 702 falling within the view cylinder region 704 is conventionally reconstructed slice by slice to generate the volumetric density file. For example, a first slice 706 is conventionally reconstructed into a reconstructed image slice of the volumetric density file. FIG. 7(b) illustrates a conventionally reconstructed first image slice 708. Due to the aforementioned padding issues the conventionally reconstructed image slice 708 contains one or more artificial rings of high density such as first artificial high density ring 712 and second artificial high density ring 714 at or near the conventional view cylinder boundary 716. Additionally, one or more regions outside of the view cylinder boundary are conventionally set to zero attenuation, thereby losing any data for any object that might reside outside of the view cylinder boundary. For example, first corner region 720, second corner region 722, third corner region 724, and fourth corner region 726 are all outside of the view cylinder boundary 716 and are conventionally zeroed out.

Figure 7C:
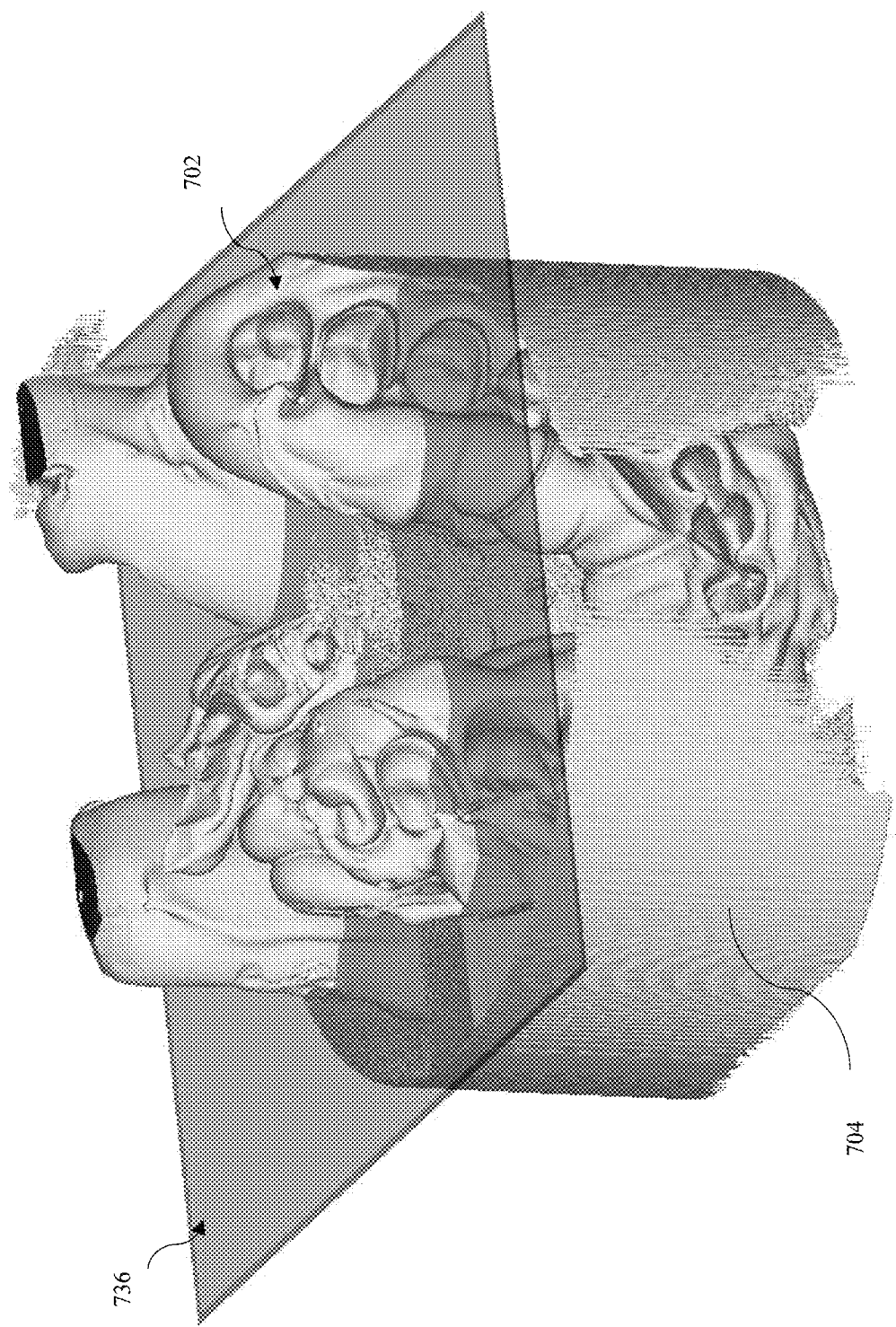
FIG. 7(c) is a perspective view of a 3D drawing illustrating conventional reconstruction.
Figure 7D:
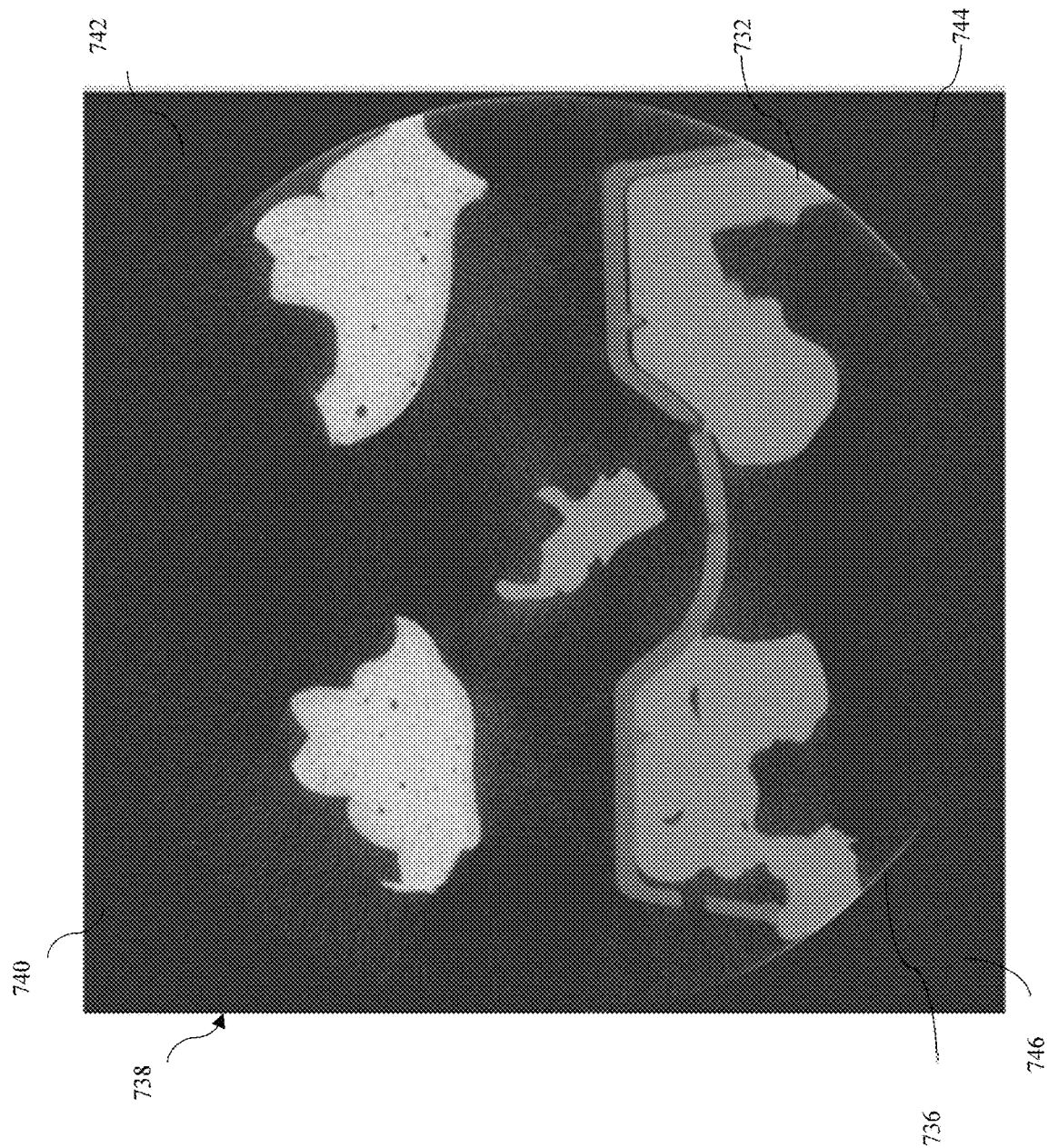
FIG. 7(d) is an illustration of a conventionally reconstructed image.

As illustrated in FIG. 7(c), a second slice 736 is conventionally reconstructed into a reconstructed image slice of the volumetric density file. FIG. 7(d) illustrates a conventionally reconstructed first image slice 738. Due to the aforementioned padding issues the conventionally reconstructed image slice 738 contains one or more artificial inner regions of high density such as high density inner region 732 at or near the conventional view cylinder boundary 736. Additionally, one or more regions outside of the view cylinder boundary are conventionally set to zero attenuation, thereby losing any data for any object that might reside outside of the view cylinder boundary. For example, first corner region 740, second corner region 742, third corner region 744, and fourth corner region 746 are all outside of the view cylinder boundary 736 and are conventionally zeroed out.

Conventional CT reconstruction of the projection images can cause several of the issues described previously due to at least a portion of the scanned object being outside of the field of view at at least one rotational position. CT reconstruction involves filtering each projection image and then back projecting the filtered projection image. Filtering conventionally involves applying a filtering function such as a ramp function or other type of filtering function known in the art to each row of the detector. Filtering is known in the art. For example, one or more filtering functions are described in FILTERING IN SPECT IMAGE RECONSTRUCTION, by Maria E. Lyra and Agapi Ploussi, Article in International Journal of Biomedical Imaging, Volume 2011, Article ID 693795, June 2011, which is hereby incorporated by reference in its entirety.

Figure 8B:
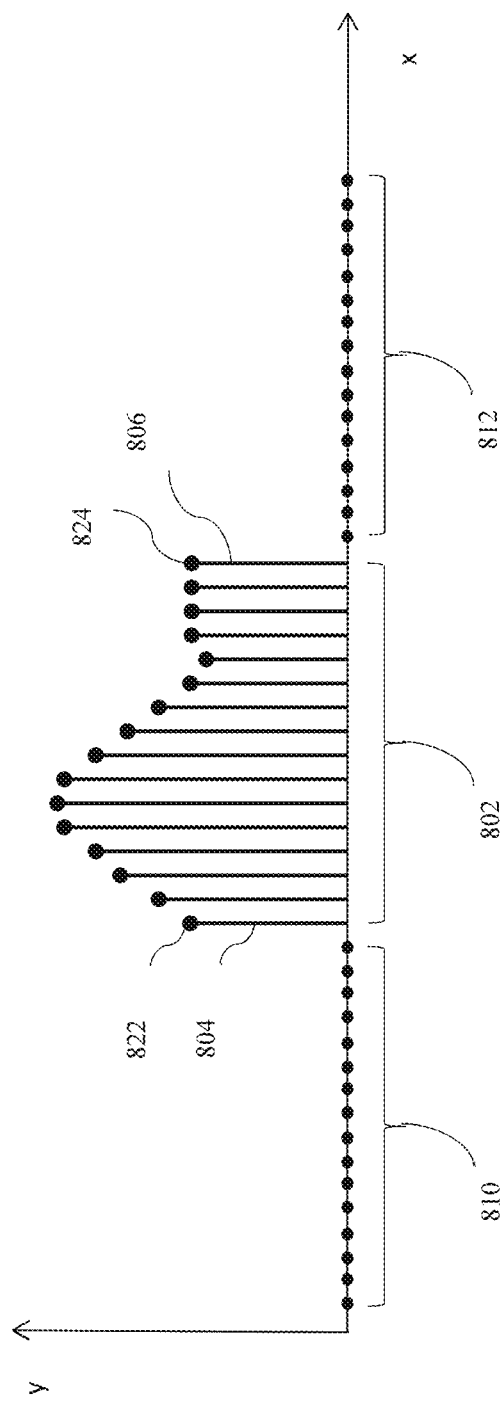

FIG. 8(a) illustrates an example of one row of values from a detector. The x-axis represents a column in the detector, and the y-axis can represent the attenuation coefficient of the detected photon count. The greater the attenuation coefficient, the greater the amount of attenuation, indicating the presence of a material, for example. The filtering function is typically continuous and infinitely long, whereas the detector row is limited to a detector width 802. In the example, the detector width 802 is 16 pixels for discussion purposes only. Detector widths can vary in length. For example, some detector widths can be 1000 pixels or more. Conventional CT reconstruction typically pads the detector row with zero value attenuation coefficients before a first detector pixel 804 and with zero value attenuation coefficients after a last detector pixel 806. For example, as illustrated in FIG. 8(b), conventional CT reconstruction typically adds a first set of zeros 810 before the first detector pixel 804 and add a last set of zeros 812 after the last detector pixel 806 prior to applying the filtering function. In some embodiments, the filtering function can be a ramp filter.

Padding each detector pixel row with zero value attenuation coefficients before the first detector pixel and after the last detector pixel prior to filtering and back projecting can cause several of the issues described previously. For example, due to the sharp change in attenuation coefficient values from zero to the first detector pixel value 822 and from the last detector pixel attenuation coefficient value 824 and zero, conventional CT reconstruction can produce the artificial single or double rings of high density at the border of the view cylinder described. Additionally, regions within the view cylinder of the reconstructed image can also be artificially brighter, inaccurately suggesting higher density than was present.

In some embodiments, a computer-implemented method of CT reconstruction can receive one or more CT projection images; perform smooth filtering on the one or more CT projection images to generate one or more smooth boundary filtered images; and back-project the one or more smooth boundary filtered images.

In some embodiments, a computer-implemented method of CT reconstruction can include receiving one or more CT projection images. The CT projection images can be generated as described previously. The one or more CT projection images can be received by the computer-implemented method in some embodiments by loading the images from storage. In some embodiments, the one or more CT projection images can be received by the computer-implemented method from another program, for example. In some embodiments, the one or more CT projection images can be received by the computer-implemented method over a computer network, for example. In some embodiments, the one or more CT projection images can be received by the computer-implemented method by any other technique known in the art.

In some embodiments, the computer-implemented method can perform smooth filtering on the one or more CT projection images to generate one or more smooth boundary filtered images. Each CT projection image can include one or more pixel rows, each pixel row can include a first detector pixel and a last detector pixel. Together, all of the pixel rows can represent the detected pixels on the detector at a particular rotational position. In some embodiments the computer-implemented method can perform smooth filtering by adding one or more smoothing pixels, each with a smoothing pixel intensity value, to each of the one or more pixel rows before the first detector pixel and after the last detector pixel to generate one or more smooth boundary rows.

Figure 9:
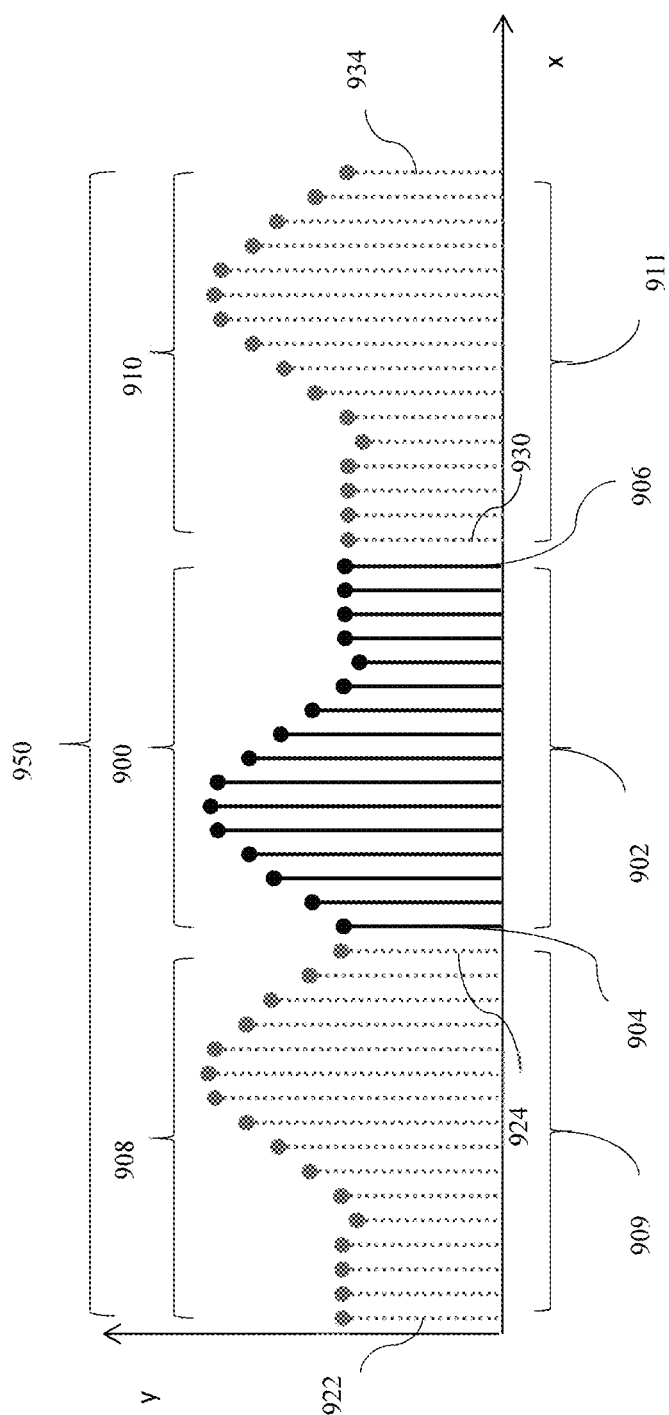
FIG. 9 is a graph illustrating pixel attenuation values for a row of a detector.

FIG. 9 is a graph illustrating an example of a detector row of pixel attenuation values, detector row 900. The x-axis represents a column in the detector, and the y-axis can represent the attenuation coefficient of the detected photon count. For example, x axis can be pixel number in one row of the detector, and the y axis is the value of a pixel after converting x-ray photon count into summed attenuation coefficient as is conventionally known in the art. A zero value means that the x-ray from the source came without any attenuation to a pixel of a detector. Detector row 900 can have a first detector pixel 904 and a last detector pixel 906 and can have a detector row width 902. In the example graph, the detector row width 902 is 16 pixels. As discussed previously, the detector row width can be any width. In some embodiments, the computer-implemented method can add one or more pre-detector row smoothing pixels 908 before the first detector pixel 904 and one or more post-detector row smoothing pixels 910 after the last detector pixel 906.

In some embodiments the computer-implemented method can add a pre-detector row of one or more pixels and a post-detector row of one or more pixels to provide a smooth boundary row. In some embodiments, the number of smoothing pixels added before the first detected pixel is at least the same as a detector width and the number of smoothing pixels added after the last detected pixel is at least the same as the detector width. In some embodiments a pre-detector row width 909 can be the same width (number of columns) as the detector row width 902. In this example, the pre-detector row width 909 is 16 columns. In some embodiments, a post-detector row width 911 can be the same width (or number of columns) as the detector row width 902. In this example, the post-detector row width 911 is 16 columns.

In some embodiments, intensity value of each of the one or more smoothing pixels is determined by performing a symmetrical continuation of all detected pixel intensity values in each pixel row. In some embodiments, symmetrical continuation can include generating a mirror image of each detector row, for example. In some embodiments, symmetrical continuation can be performed as follows: given pixel values in a row $v_n$, where n in $[0,w-1]$, w is the number of pixels in the row, symmetrical continuation to the left is given by the formula $v_{-n-1}=v_n$, and symmetrical continuation to the right by $v_{w+n}=v_{w-n-1}$.

For example, in some embodiments, the computer-implemented method can generate a symmetrical continuation by reversing the pixel attenuation coefficient values of the detector row 900. For example, as illustrated in FIG. 9, pre-detector row 908 can include a first pre-detector pixel 922 that corresponds to the last detector pixel 906. Pre-detector row 908 can include a last pre-detector pixel 924 that corresponds to the first detector pixel 904. Similarly, all other detector row pixels can be reversed so that the pre-detector row 908 pixels are a mirror image of the detector 900. The pre-detector row can be added before the first detector pixel 904. The same mirror image of pixel can be used as the post-detector row 910 that is added after the last detector pixel 906.

For example, as illustrated in FIG. 9, post-detector row 910 can include a first post-detector pixel 930 that corresponds to the last detector pixel 906. Post-detector row 910 can include a last post-detector pixel 934 that corresponds to the first detector pixel 904. Similarly, all other detector row pixels can be reversed so that the post-detector row 910 pixels are a mirror image of the detector 900. The post-detector row can be added after the last detector pixel 906 in some embodiments. In this manner, the computer-implemented method provide a smooth boundary row. For example, the computer-implemented method can provide smooth boundary row 950. As can be seen, the transition from the first-detected pixel 904 to the last pre-detector pixel 924 is smooth rather than abrupt. Similarly, the transition from the last-detected pixel 906 to the first post-detector pixel 930 is smooth rather than abrupt. In some embodiments the smoothing pixel intensity value is non-zero. Some embodiments can include determining detected pixel intensity values in each pixel row.

In some embodiments smooth filtering can include applying a filter function to the one or more smooth boundary rows to provide one or more smooth filtered boundary rows. Any type of CT reconstruction filtering function known in the art can be applied. In some embodiments, applying a filtering function can include convolving the one or more smooth boundary rows with the filter function. In some embodiments, for example, a ramp filtering function can be applied. In some embodiments, the filter function can be applied to the entire smooth boundary row, including, for example, the pre-detector row, the detector row, and the post-detector row. In some embodiments, the computer-implemented method can apply the filter function to the entire smooth boundary row. For example, the computer-implemented method can apply the filter function to the smooth boundary row 950. In some embodiments, the computer-implemented method can generate a smooth boundary row for one or more rows in the detector and apply the filter function to each smooth boundary row to provide a smooth boundary filtered CT projection image. In some embodiments, the computer-implemented method performs smooth filtering to each row independent of other rows. In some embodiments, the computer-implemented method can process individual rows in parallel. One or more advantages of processing individual rows in parallel is improved speed and efficiency.

In some embodiments, the computer-implemented method can back-project the one or more smooth boundary filtered CT projection images. In some embodiments back-projecting can include smearing back the one or more smooth filtered CT projection images on to the reconstruction volume as is known in the art. For example, in some embodiments, the smearing back is along the same rays joining in x-ray source position to hit detector pixels.

In some embodiments back-projecting can include augmented back-projecting. In some embodiments, augmented back-projecting can include not zeroing out regions outside of the view cylinder, for example. For example, in some embodiments, augmented back-projecting can include back-projecting all values as detected from the detector. In some embodiments augmented back-projecting can include back-projecting a volume outside of a view cylinder boundary. For example, in some embodiments, augmented back-projecting can comprise back-projecting one or more regions of a slice outside of the view cylinder boundary For example, in some embodiments augmented back-projecting can include back-projecting all detected values. In some embodiments, the back-projecting can be any back-projection technique known in the art, such as those described in *Principles of Computerized Tomographic Imaging*. For example, back-projecting for a parallel beam x-ray source is conventionally known as follows:

$$f(x,y)=\frac{1}{2}\pi\Sigma_{i=0}^{n-1}\Delta\theta_i g_{\theta_i}(x\cos\theta_i + y\sin\theta_i)$$

$$g_\theta(t)=p_\theta(t)\cdot k(t)$$

where $\Delta\theta$ is an angular spacing between projections, and $k(t)$ is a radon kernel with frequency response $|\omega|$ For example, back-projecting for a cone-beam x-ray source is conventionally known as follows:

$$g(t,s,z)=\int_0^{2\pi}(D^2_{SO}/(D_{SO}-s)^2)Q_\beta(D_{SO}t/(D_{SO}-s)),(D_{SO}z/(D_{SO}-s)))d\beta$$

where (t,s,z) is the original coordinate system, $D_{SO}$ is the source distance, $\beta$ is the angular differential change.

Back-projection can include changing each voxel based on pixel values of the filtered projection in regions where a ray from the source and the voxel hits the projection image. For voxels inside the view cylinder, every ray hits every projection within its boundaries. For voxels outside the view cylinder, the rays miss some projections. Such missed projections are ignored, and the voxel is not changed.

Figure 10:
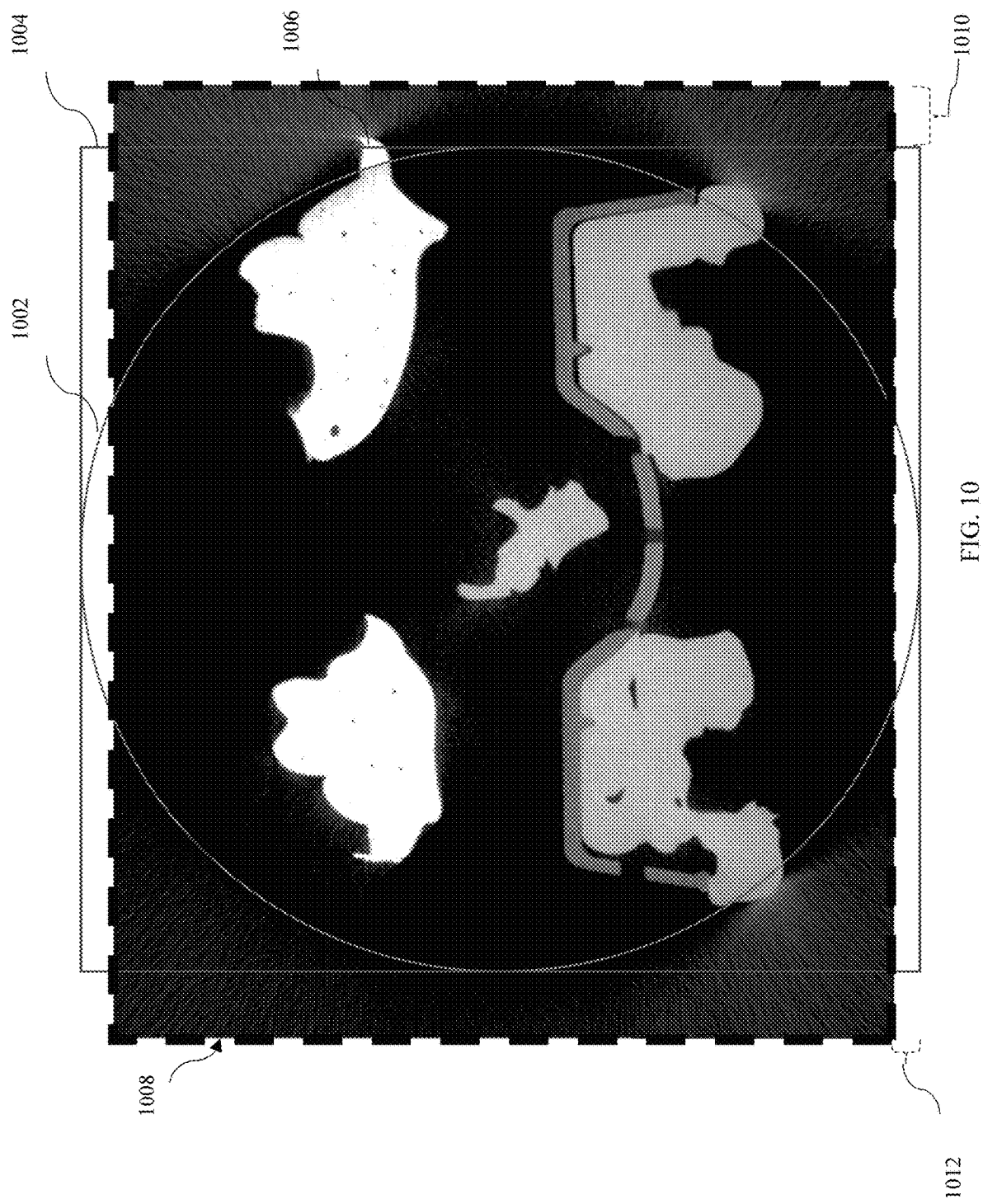
FIG. 10 is an illustration of a reconstructed image comparing reconstruction volumes.

In some embodiments, the computer-implemented method can select a larger volume size to capture regions outside of the view cylinder boundary that were reconstructed by augmented back-projection. In some embodiments, the volume size can be selected by adjusting a setting in the CT scanner, for example. In some embodiments a volume size can be determined automatically augmented back-projecting can include: reconstructing, for example, one (e.g. central) z-slice in the volume larger than the view cylinder, determine within the one z-slice a rectangle with significantly not-zero pixels, define the volume based on this rectangle and detector height. In some embodiments, the computer-implemented method does not limit itself to reconstruction of voxels inside the view cylinder boundary, but performs reconstruction for all voxels of the selected volume. Increasing the volume size can advantageously provide additional detail. FIG. 10 is an illustration of a projection image to show a comparison between conventional volume selection and the larger volume size as described in the current disclosure. Conventional reconstruction avoids computing voxel densities outside of a view cylinder boundary such as view cylinder boundary 1002 by placing zeros outside of the view cylinder boundary. Conventional volume size selected is thus tightly bound to the view cylinder boundary. For example, as illustrated in the figure, conventional volume 1004 can be seen to be tightly bound to the view cylinder boundary 1002. Some data-containing regions such as region 1006 fall outside of the conventional volume 1004, and is lost in conventional reconstruction. In some embodiments, the computer-implemented method can reconstruct a larger volume than a view cylinder boundary. In some embodiments, the computer-implemented method can select a volume such as larger volume 1008. In some embodiments, the larger volume can be non-square in shape. For example, in some embodiments, the larger volume can be rectangular in shape. In some embodiments, the larger volume dimensions can be adjusted to include detected regions and to exclude non-detected regions. For example, the larger volume 1008 can, with respect to the conventional volume 1004, be expanded by a first length 1010. This can include the otherwise conventionally excluded region 1006. To save time and space, the computer-implemented method can in some embodiments reduce the volume size of the larger volume 1008. For example, in the figure, the computer-implemented method can reduce the height by a second length 1012 compared to the conventional volume 1004.

Figure 11A:
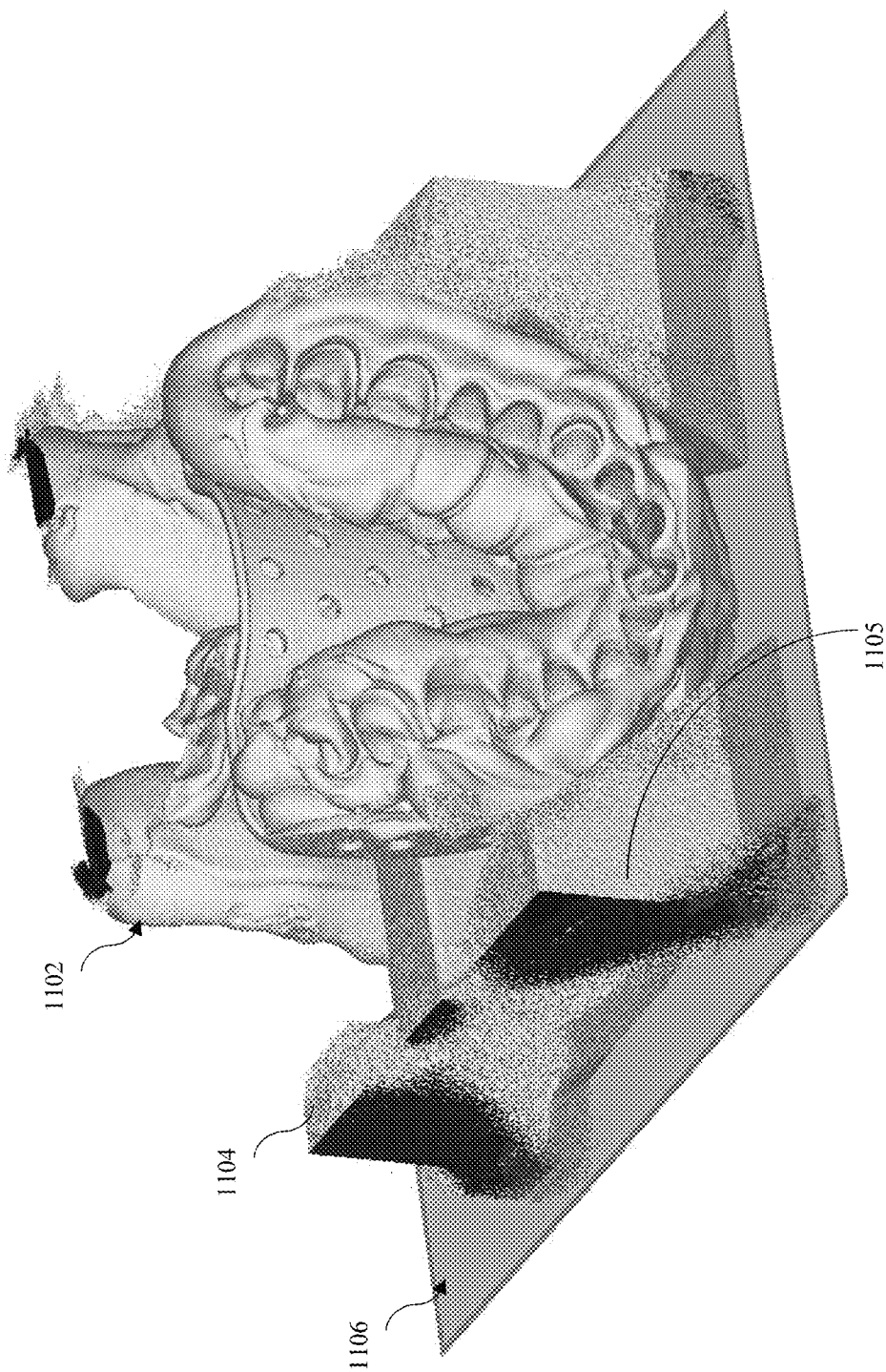
FIG. 11(a) is a perspective view of a 3D drawing illustrating reconstruction in accordance with some embodiments.

FIG. 11(a) illustrates an example of CT reconstruction utilizing one or more features in the present disclosure. For example, in FIG. 11(a), the computer-implemented method performs augmented back-projection of one or more smooth boundary filtered CT projection images. Although these features are both illustrated together in this example, they can be implemented individually in some embodiments. For example, in some embodiments, the computer-implemented method can perform only smooth boundary filtering. In some embodiments, the computer-implemented method can perform only augmented back-projection. In some embodiments, the computer-implemented method can perform one or more features in any combination.

Figure 11B:
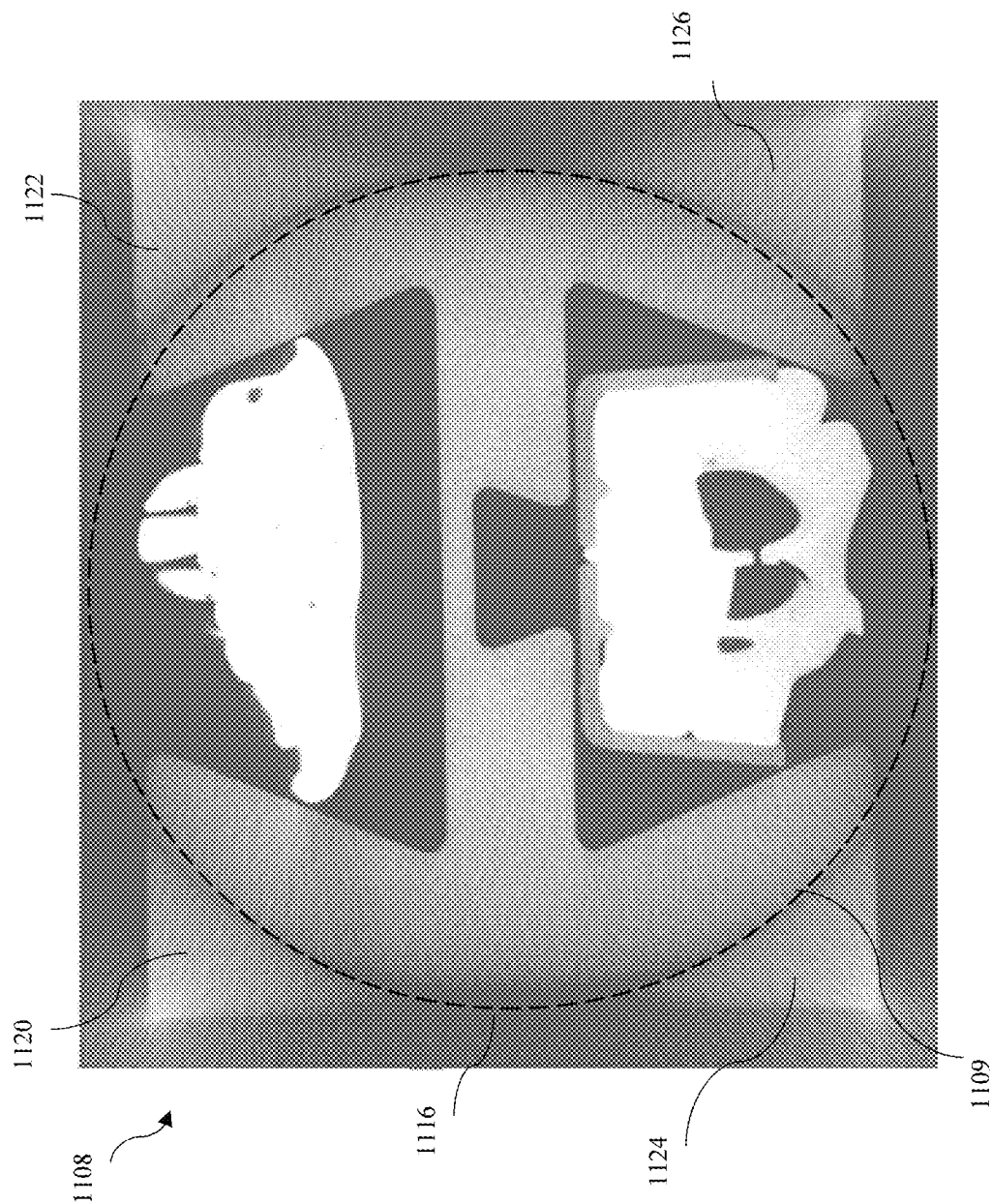
FIG. 11(b) is an illustration of a reconstructed image in accordance with some embodiments.

A scanned object 1102 can be reconstructed slice by slice to generate the volumetric density file. As can be seen in the figure, due to augmented back-projection, reconstruction is not limited to within the view cylinder boundary. One or more regions outside of a conventional view cylinder boundary can be reconstructed. For example, first out-of-view region 1104 and second out-of-view region 1105 can be reconstructed. Other out-of-view regions may be present in the figure as well. In some embodiments, the computer-implemented method can reconstruct a first slice 1106 into a reconstructed image slice of the volumetric density file. FIG. 11(b) illustrates a reconstructed first image slice 1108. The first reconstructed image slice 1108 does not contain one or more artificial rings of high density within the image 1109 at or near what would be a hypothetical conventional view cylinder boundary, such as the hypothetical conventional view cylinder boundary 1116. Additionally, one or more regions that would be conventionally outside of the hypothetical conventional view cylinder boundary are visible. For example, first corner region 1120, second corner region 1122, third corner region 1124, and fourth corner region 1126 are all reconstructed and visible, despite being outside of the hypothetical conventional view cylinder boundary 1116. It is noted that the view cylinder boundary 1116 is shown on the figure as a hypothetical of what a conventional view cylinder boundary could look like. No actual view cylinder boundary is present in FIG. 11(a) or FIG. 11(b).

Figure 11C:
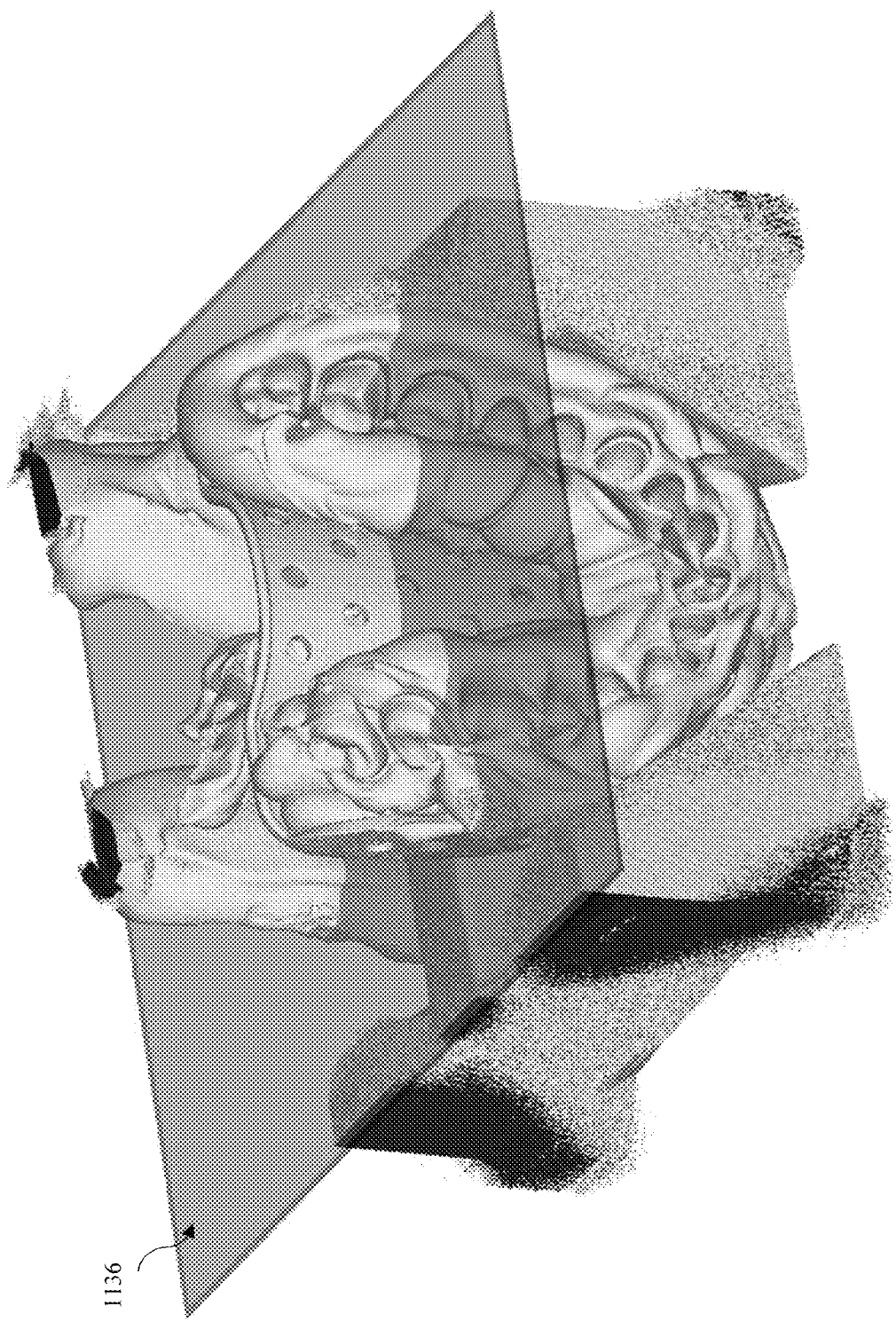
FIG. 11(c) is a perspective view of a 3D drawing illustrating reconstruction in accordance with some embodiments.
Figure 11D:
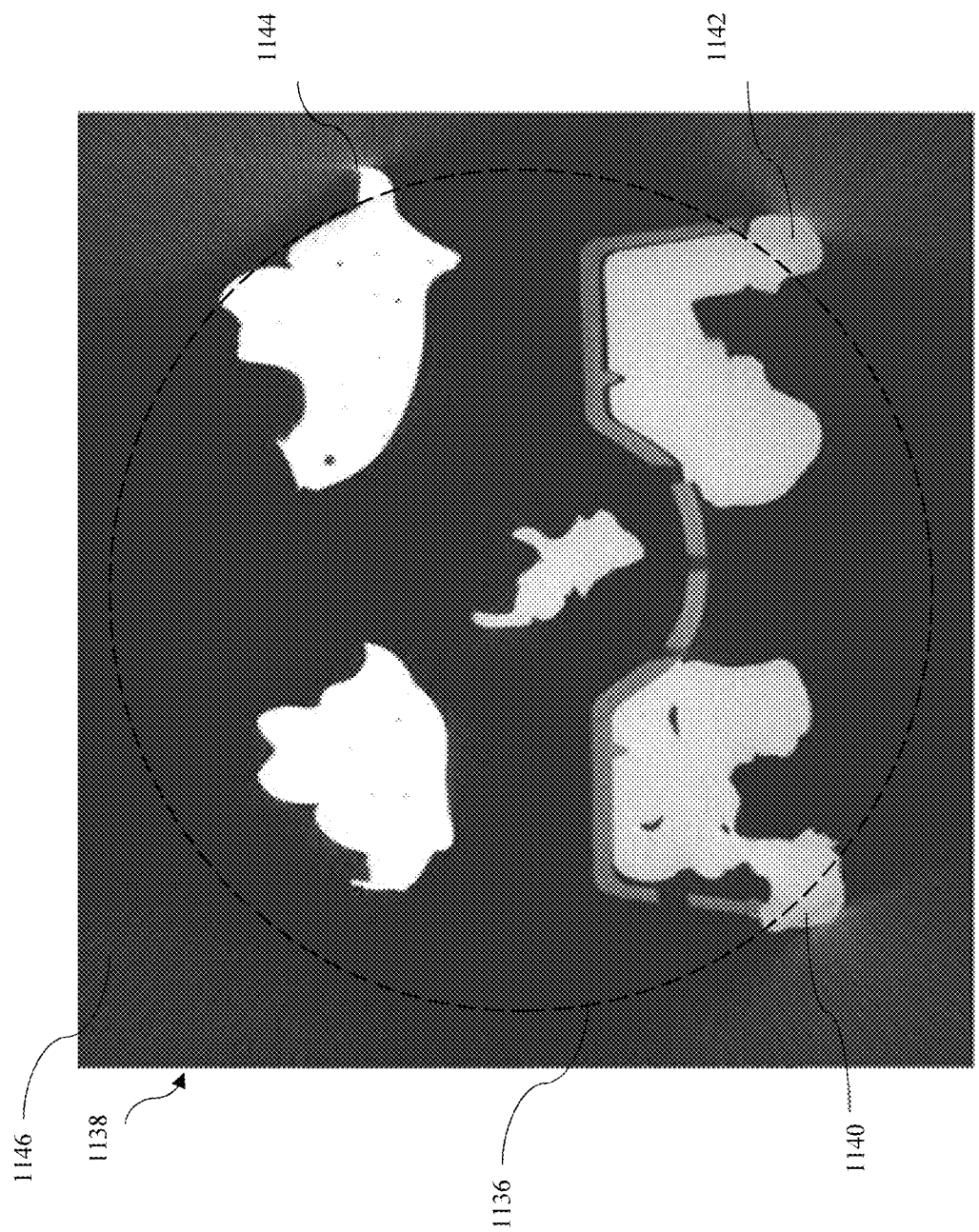
FIG. 11(d) is an illustration of a reconstructed image in accordance with some embodiments.

As illustrated in FIG. 11(c), a second slice 1136 is reconstructed into a reconstructed image slice of the volumetric density file according to one or more features in the present disclosure. FIG. 11(d) illustrates a reconstructed first image slice 1138 using one or more features in the present disclosure. Due to smooth filtering, the reconstructed image slice 1138 contains no artificial inner regions of high density or any artificially bright regions within a at or near a hypothetical conventional view cylinder boundary 1136. Additionally, one or more regions outside of the view cylinder boundary are visible and not lost. For example, first region 1140, second region 1142, third region 1144, and fourth corner region 1146 are all outside of the hypothetical view cylinder boundary 1136. It is noted that the view cylinder boundary 1136 is shown on the figure as a hypothetical of what a conventional view cylinder boundary could look like. No actual view cylinder boundary is present in FIG. 11(c) or FIG. 11(d).

In some embodiments, the computer-implemented method can receive as inputs scanner geometry, including but not limited to distance from source to rotation axis, from source to detector, detector pixel size, and optionally other CT scanner parameters. The computer-implemented method can also receive one or more projection images as well as the volume size. The computer-implemented method can in some embodiments create a volume of requested size, initially filled with zeros. The computer-implemented method can in some embodiments process every projection as follows: add smoothing pixels, perform filtering, and perform back-projection. In back-projection, every voxel on the line between the source and a point on the projection can be modified by the back-projection formula. This step can consider that the position of the scanned object (and so the position of each voxel) depends on the rotation angle corresponding to a particular projection.

Figure 12:
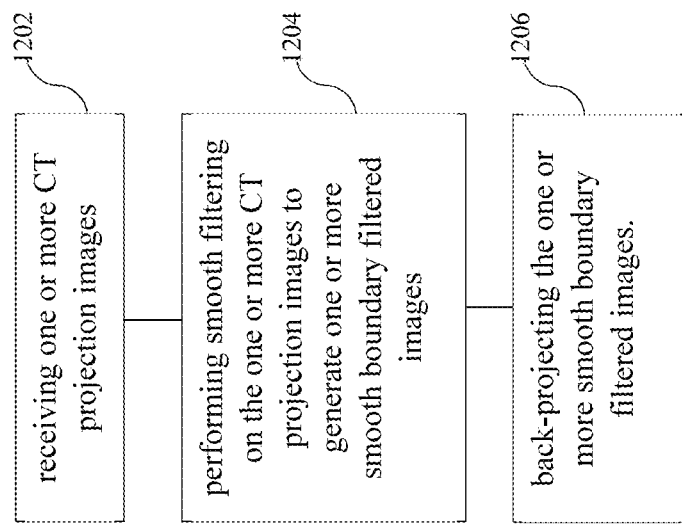
FIG. 12 is a flowchart in some embodiments.

FIG. 12 is a flowchart illustrating one embodiment. A computer-implemented method of CT reconstruction can include receiving one or more CT projection images at 1202; performing smooth filtering on the one or more CT projection images to generate one or more smooth boundary filtered images at 1204; and back-projecting the one or more smooth boundary filtered images at 1206.

In some embodiments, a system to CT reconstruct images can include: a processor; a computer-readable storage medium including instructions executable by the processor to perform steps including: receiving one or more CT projection images; performing smooth filtering on the one or more CT projection images to generate one or more smooth boundary filtered images; and back-projecting the one or more smooth boundary filtered images.

Some embodiments can include a non-transitory computer readable medium storing executable computer program instructions for CT reconstruction, the computer program instructions including instructions for: receiving one or more CT projection images; performing smooth filtering on the one or more CT projection images to generate one or more smooth boundary filtered images; and back-projecting the one or more smooth boundary filtered images.

Some embodiments of the computer-implemented method, system, and computer program instructions on the non-transitory computer readable medium can optionally include one or more of the following features, either alone or in combination. Each CT projection image can include one or more pixel rows, each pixel row including a first detector pixel and a last detector pixel. Smooth filtering can include adding one or more smoothing pixels, each with a smoothing pixel intensity value, to each of the one or more pixel rows before the first detector pixel and after the last detector pixel to generate one or more smooth boundary rows. The smoothing pixel intensity value of each of the one or more smoothing pixels can be determined by performing a symmetrical continuation of all detector pixel intensity values in each pixel row. The number of smoothing pixels added before the first detected pixel can be at least the same as a detector width and the number of smoothing pixels added after the last detected pixel can be at least the same as the detector width. Smooth filtering can include applying a filter function to the one or more smooth boundary rows to provide one or more smooth filtered CT projection images. Back-projecting can include augmented back-projecting. Augmented back-projecting can include back-projecting a volume outside of a view cylinder boundary. The smoothing pixel intensity value can be non-zero.

One or more advantages of one or more features can include, for example, inclusion of regions of the scanned object in the CT reconstruction volume that would conventionally be excluded. One or more advantages of one or more features can include, for example, no artificial rings or regions of high density in the reconstructed volume. One or more advantages of one or more features can include, for example, improved quality of reconstruction and greater detail and more information regarding the scanned object. One or more advantages of one or more features can include, for example, higher tolerance for lateral shifts, or misalignment of the scanned object in the CT scanner. One or more advantages of one or more features can include, for example, capturing more or all of the scanned object. One or more advantages of one or more features can include, for example, out-of-view regions being visible. One or more advantages of one or more features can include, for example, inner regions of the volume not having artificial regions of high density.

FIG. 13 illustrates a processing system 14000 in some embodiments. The system 14000 can include a processor 14030, computer-readable storage medium 14034 having instructions executable by the processor to perform one or more steps described in the present disclosure.

One or more of the features disclosed herein can be performed and/or attained automatically, without manual or user intervention. One or more of the features disclosed herein can be performed by a computer-implemented method. The features—including but not limited to any methods and systems—disclosed may be implemented in computing systems. For example, the computing environment 14042 used to perform these functions can be any of a variety of computing devices (e.g., desktop computer, laptop computer, server computer, tablet computer, gaming system, mobile device, programmable automation controller, video card, etc.) that can be incorporated into a computing system can include one or more computing devices. In some embodiments, the computing system may be a cloud-based computing system.

For example, a computing environment 14042 may include one or more processing units 14030 and memory 14032. The processing units execute computer-executable instructions. A processing unit 14030 can be a central processing unit (CPU), a processor in an application-specific integrated circuit (ASIC), or any other type of processor. In some embodiments, the one or more processing units 14030 can execute multiple computer-executable instructions in parallel, for example. In a multi-processing system, multiple processing units execute computer-executable instructions to increase processing power. For example, a representative computing environment may include a central processing unit as well as a graphics processing unit or co-processing unit. The tangible memory 14032 may be volatile memory (e.g., registers, cache, RAM), non-volatile memory (e.g., ROM, EEPROM, flash memory, etc.), or some combination of the two, accessible by the processing unit(s). The memory stores software implementing one or more innovations described herein, in the form of computer-executable instructions suitable for execution by the processing unit(s).

A computing system may have additional features. For example, in some embodiments, the computing environment includes storage 14034, one or more input devices 14036, one or more output devices 14038, and one or more communication connections 14037. An interconnection mechanism such as a bus, controller, or network, interconnects the components of the computing environment. Typically, operating system software provides an operating environment for other software executing in the computing environment, and coordinates activities of the components of the computing environment.

The tangible storage 14034 may be removable or non-removable and includes magnetic or optical media such as magnetic disks, magnetic tapes or cassettes, CD-ROMs, DVDs, or any other medium that can be used to store information in a non-transitory way and can be accessed within the computing environment. The storage 14034 stores instructions for the software implementing one or more innovations described herein.

The input device(s) may be, for example: a touch input device, such as a keyboard, mouse, pen, or trackball; a voice input device; a scanning device; any of various sensors; another device that provides input to the computing environment; or combinations thereof. For video encoding, the input device(s) may be a camera, video card, TV tuner card, or similar device that accepts video input in analog or digital form, or a CD-ROM or CD-RW that reads video samples into the computing environment. The output device(s) may be a display, printer, speaker, CD-writer, or another device that provides output from the computing environment.

The communication connection(s) enable communication over a communication medium to another computing entity. The communication medium conveys information, such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Any of the disclosed methods can be implemented as computer-executable instructions stored on one or more computer-readable storage media 14034 (e.g., one or more optical media discs, volatile memory components (such as DRAM or SRAM), or nonvolatile memory components (such as flash memory or hard drives)) and executed on a computer (e.g., any commercially available computer, including smart phones, other mobile devices that include computing hardware, or programmable automation controllers) (e.g., the computer-executable instructions cause one or more processors of a computer system to perform the method). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media 14034. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, Python, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

In view of the many possible embodiments to which the principles of the disclosure may be applied, it should be recognized that the illustrated embodiments are only examples and should not be taken as limiting the scope of the disclosure.

What is claimed is:

1. A computer-implemented method of CT reconstruction, comprising:
    receiving one or more CT projection images;
    performing smooth filtering on the one or more CT projection images to generate one or more smooth boundary filtered images; and
    back-projecting the one or more smooth boundary filtered images,
    wherein each CT projection image comprises one or more pixel rows, each pixel row comprising a first detector pixel and a last detector pixel,
    wherein smooth filtering comprises adding one or more smoothing pixels, each with a smoothing pixel intensity value, to each of the one or more pixel rows before the first detector pixel and after the last detector pixel to generate one or more smooth boundary rows.

2. The method of claim 1, wherein the smoothing pixel intensity value of each of the one or more smoothing pixels is determined by performing a symmetrical continuation of all detector pixel intensity values in each pixel row.

3. The method of claim 1, wherein the number of smoothing pixels added before the first detected pixel is at least the same as a detector width and the number of smoothing pixels added after the last detected pixel is at least the same as the detector width.

4. The method of claim 1, wherein smooth filtering comprises applying a filter function to the one or more smooth boundary rows to provide one or more smooth filtered CT projection images.

5. The method of claim 1, wherein the smoothing pixel intensity value is non-zero.

6. A system to CT reconstruct images, comprising:
a processor;
a computer-readable storage medium comprising instructions executable by the processor to perform steps comprising:
receiving one or more CT projection images;
performing smooth filtering on the one or more CT projection images to generate one or more smooth boundary filtered images; and
back-projecting the one or more smooth boundary filtered images
wherein each CT projection image comprises one or more pixel rows, each pixel row comprising a first detector pixel and a last detector pixel,
wherein smooth filtering comprises adding one or more smoothing pixels, each with a smoothing pixel intensity value, to each of the one or more pixel rows before the first detector pixel and after the last detector pixel to generate one or more smooth boundary rows.

7. The system of claim 6, wherein smooth filtering comprises applying a filter function to the one or more smooth boundary rows to provide one or more smooth filtered CT projection images.

8. The system of claim 6, wherein the smoothing pixel intensity value is non-zero.

9. A non-transitory computer readable medium storing executable computer program instructions for CT reconstruction, the computer program instructions comprising instructions for:
receiving one or more CT projection images;
performing smooth filtering on the one or more CT projection images to generate one or more smooth boundary filtered images; and
back-projecting the one or more smooth boundary filtered images
wherein each CT projection image comprises one or more pixel rows, each pixel row comprising a first detector pixel and a last detector pixel,
wherein smooth filtering comprises adding one or more smoothing pixels, each with a smoothing pixel intensity value, to each of the one or more pixel rows before the first detector pixel and after the last detector pixel to generate one or more smooth boundary rows.

10. The non-transitory computer readable medium of claim 9, wherein back-projecting comprises back-projecting a volume outside of a view cylinder boundary.

* * * * *